United States Patent
Low et al.

(10) Patent No.: US 9,718,173 B2
(45) Date of Patent: Aug. 1, 2017

(54) HANDHELD MACHINE TOOL HAVING A TOOL HOLDING FIXTURE

(75) Inventors: Chun How Low, Penang (MY); Chun Chee Loh, Penang (MY); Mohsein Wan, Bukit Mertajam Penang (MY); Siew Yuen Lee, Pulau Penang (MY)

(73) Assignee: Robert Bosch GMBH, Stuttgart (DE)

( * ) Notice: Subject to any disclaimer, the term of this patent is extended or adjusted under 35 U.S.C. 154(b) by 590 days.

(21) Appl. No.: 13/703,165

(22) PCT Filed: May 18, 2011

(86) PCT No.: PCT/EP2011/058057
§ 371 (c)(1),
(2), (4) Date: Feb. 28, 2013

(87) PCT Pub. No.: WO2011/154230
PCT Pub. Date: Dec. 15, 2011

(65) Prior Publication Data
US 2013/0154202 A1 Jun. 20, 2013

(30) Foreign Application Priority Data

Jun. 9, 2010 (DE) .......................... 10 2010 029 829
Jun. 29, 2010 (DE) .......................... 10 2010 030 642

(51) Int. Cl.
*B23B 31/107* (2006.01)
*B25B 23/00* (2006.01)

(52) U.S. Cl.
CPC ...... *B25B 23/0035* (2013.01); *B23B 31/1071* (2013.01); *B25B 23/00* (2013.01);
(Continued)

(58) Field of Classification Search
CPC ... B23B 31/107; B23B 31/22; B23B 31/1071; B25B 23/00; Y10T 279/17726;
(Continued)

(56) References Cited

U.S. PATENT DOCUMENTS 864,992 A * 9/1907 Roberts .......................... 279/56
973,345 A * 10/1910 Dalton ............................ 279/72
(Continued)

FOREIGN PATENT DOCUMENTS

CN 201283554 8/2009
DE 3421811 A1 * 12/1985 ............. B25D 17/08
(Continued)

OTHER PUBLICATIONS

Machine translations of German patent DE 3421811A1, to Brix, P., "Tool holder for drilling and chiselling appliances", Dec. 1985.*

*Primary Examiner* — Eric A Gates
*Assistant Examiner* — Chwen-Wei Su
(74) *Attorney, Agent, or Firm* — Norton Rose Fulbright US LLP; Gerard Messina (57) ABSTRACT

In a handheld machine tool having a tool holding fixture, which has a multi-faced inner receptacle and a multi-faced outer receptacle, the multi-faced inner receptacle being configured for the connection to a first tool insert, which is able to be locked in the multi-faced inner receptacle using a locking device assigned to the tool holding fixture, and the multi-faced outer receptacle being configured for the connection to a second tool insert, which has an inner multi-faced coupling that is able to be slid onto the multi-faced outer receptacle. The locking device has an actuating element, which is rotatable about a longitudinal axis of the tool holding fixture for unlocking the first tool insert from a specified locking position into a specified unlocking position.

7 Claims, 10 Drawing Sheets

(52) U.S. Cl.
CPC .......... *Y10S 279/905* (2013.01); *Y10T 279/17* (2015.01); *Y10T 279/17726* (2015.01); *Y10T 279/29* (2015.01)

(58) Field of Classification Search
CPC .......... Y10T 279/29; Y10T 279/17068; Y10T 279/17076; Y10T 279/17085; Y10T 279/17094; Y10T 279/17717; Y10S 279/905
USPC ............................................. 279/137, 72, 905
See application file for complete search history.

(56) References Cited

U.S. PATENT DOCUMENTS

| | | | |
|---|---|---|---|
| 1,162,197 A * | 11/1915 | Wahlstrom | 279/72 |
| 1,351,347 A * | 8/1920 | Russell | 279/72 |
| 2,518,139 A | 8/1950 | Hallowell et al. | |
| 3,536,335 A * | 10/1970 | Schmuck | B25D 17/088 279/81 |
| 4,002,348 A * | 1/1977 | Johnson | 279/75 |
| 4,563,116 A * | 1/1986 | Edens | 409/136 |
| 4,708,548 A * | 11/1987 | Taylor et al. | 409/234 |
| 5,481,949 A | 1/1996 | Yen | |
| 5,577,743 A * | 11/1996 | Kanaan et al. | 279/72 |
| 6,932,358 B1 * | 8/2005 | Geisman et al. | 279/71 |
| 7,028,589 B1 | 4/2006 | Cheng | |
| 7,845,428 B2 * | 12/2010 | Sakamaki et al. | 173/164 |
| 2004/0104545 A1 | 6/2004 | Chen | |
| 2005/0132846 A1 | 6/2005 | Lai | |
| 2008/0244913 A1 * | 10/2008 | Lin | 30/167 |

FOREIGN PATENT DOCUMENTS

| | | |
|---|---|---|
| DE | 203 17 932 | 2/2004 |
| EP | 1 938 927 | 7/2008 |
| EP | 2 039 449 | 3/2009 |

* cited by examiner

HANDHELD MACHINE TOOL HAVING A TOOL HOLDING FIXTURE

FIELD OF THE INVENTION

The present invention relates to a handheld machine tool having a tool holding fixture, which has a multi-faced inner receptacle and a multi-faced outer receptacle, the multi-faced inner receptacle being configured to connect to a first tool insert, which is able to be locked in the locking device associated with the tool holding fixture, and the multi-faced outer receptacle is configured for connecting to a second tool insert which has an inner multi-faced coupling that is able to be slid onto the multi-faced outer receptacle.

BACKGROUND INFORMATION

From European document EP 2 039 449 A1, a handheld machine tool configured as a rotary blow screwdriver is discussed, which has a tool holding fixture which is able to be connected both to a tool insert having an outer multi-faced coupling, such as a screwdriver bit, and to a tool insert having an inner multi-faced coupling, such as a socket wrench. To fix a screwdriver bit to the tool holding fixture, a locking device is provided in which an actuating sleeve, in an associated locking position, presses retaining balls radially inwards through openings provided in the tool holding fixture, so that the retaining balls engage with a groove configured on the outer multi-faced coupling of the screwdriver bit, and thus lock the screwdriver bit in the multi-faced inner receptacle of the tool holding fixture. The actuating sleeve is prestressed in an axial direction facing away from the screwdriver bit, using an associated compression spring and, to unlock the screwdriver bit, it has to be pushed against the force of this spring axially in the direction of the screwdriver bit, to enable the release of the retaining balls.

In the related art, the disadvantage is that the handling of the handheld machine tool is awkward and complicated during an actuation of the actuating sleeve, and consequently leads to a loss of convenience in the use of such a handheld machine tool.

SUMMARY OF THE INVENTION

It is therefore an object of the exemplary embodiments and/or exemplary methods of the present invention to provide a new handheld machine tool which has a tool holding fixture having a locking device which enables a simple and rapid unlocking of a tool insert having an outer multi-faced coupling.

The object may be attained by a handheld machine tool having a tool holding fixture which has a multi-faced inner receptacle and a multi-faced outer receptacle. The multi-faced inner receptacle is configured for connecting to a first tool insert, which is able to be locked to a locking device associated with the tool holding fixture in the multi-faced inner receptacle. The multi-faced outer receptacle is configured for connecting to a second tool insert, which has an inner multi-faced coupling that is able to be slid onto the multi-faced outer receptacle. The locking device has an actuating element which, for unlocking the first tool insert from a specified locking position, is rotatable about a longitudinal axis of the tool holding fixture into a specified unlocking position.

The exemplary embodiments and/or exemplary methods of the present invention are intended to provide a handheld machine tool having a tool holding fixture in which a tool insert having an outer multi-faced coupling is able to be locked reliably and securely, and which is easy to handle during unlocking, for removing such a tool insert.

According to one specific embodiment, the locking device has a blocking element for blocking the actuating element in the specified locking position or in the specified unlocking position.

Consequently, a certain blocking of the actuating element is able to be made possible in the locking position and in the unlocking position.

The actuating element may have a first and a second stopping element. In the specified unlocking position, the first stopping element lies against the blocking element so as to block the actuating element. In the specified locking position, the second stopping element lies against the blocking element so as to block the actuating element.

Consequently, reliable blocking of the actuating element is able to be achieved in the locking position and in the unlocking position at the blocking element in a simple manner.

The blocking element may be configured to prevent rotation of the actuating element beyond the specified locking position or the specified unlocking position.

Thus one is able to achieve stable and reliable blocking of the actuating element by the blocking element.

According to one specific embodiment, the actuating element is configured to be sleeve-shaped, and has a recess at its inner circumference, at which the blocking element is situated, at least in sections, and at which the first and second stopping element are configured in a shoulder-type manner.

Thus, the exemplary embodiments and/or exemplary methods of the present invention are intended to provide an uncomplicated and cost-effective actuating element.

The sleeve-shaped actuating element may be situated coaxially with the longitudinal axis of the tool holding fixture.

Thus one may achieve a simple and functionally safe positioning of the actuating element.

The blocking element may be configured like a bolt.

Thus a stable and cost-effective blocking element may be provided.

According to one specific embodiment, the locking device has a spring element, which is configured to act upon the actuating element using a specified spring force in a direction running transversely to the longitudinal axis of the tool holding fixture.

Consequently, the present invention enables providing an actuating element that is able to be adjusted in a simple manner, starting from the spring element, from the unlocking position back into the locking position.

The actuating element may be configured to be sleeve-shaped, and has on its inner circumference a groove having a stop, against which the spring element lies in the specified locking position.

Thus a simple and cost-effective actuating element may be provided.

The spring element may be configured to act upon the actuating element in the specified unlocking position using its spring force, to make possible the rotation of the actuating element relative to the tool holding fixture, the groove on the spring element being displaced until the stopping of the stop at the spring element.

Consequently, the present invention makes possible a convenient and automatic adjustment of the actuating element from the unlocking position into the locking position by the spring force of the spring element.

The spring element may have a pressure spring and a ball acted upon by it against the actuating element.

Thus a simple and functionally safe spring element may be provided.

The object mentioned at the outset is also attained by a tool holding fixture having a multi-faced inner receptacle and a multi-faced outer receptacle. The multi-faced inner receptacle is configured for connecting to a first tool insert, which is able to be locked to a locking device associated with the tool holding fixture in the multi-faced inner receptacle. The multi-faced outer receptacle is configured for connecting to a second tool insert, which has an inner multi-faced coupling that is able to be slid onto the multi-faced outer receptacle. The locking device has an actuating element which, for unlocking the first tool insert from a specified locking position, is rotatable about a longitudinal axis of the tool holding fixture into a specified unlocking position.

The exemplary embodiments and/or exemplary methods of the present invention are explained in greater detail in the following description on the basis of exemplary embodiments illustrated in the drawings.

DETAILED DESCRIPTION

Figure 1:
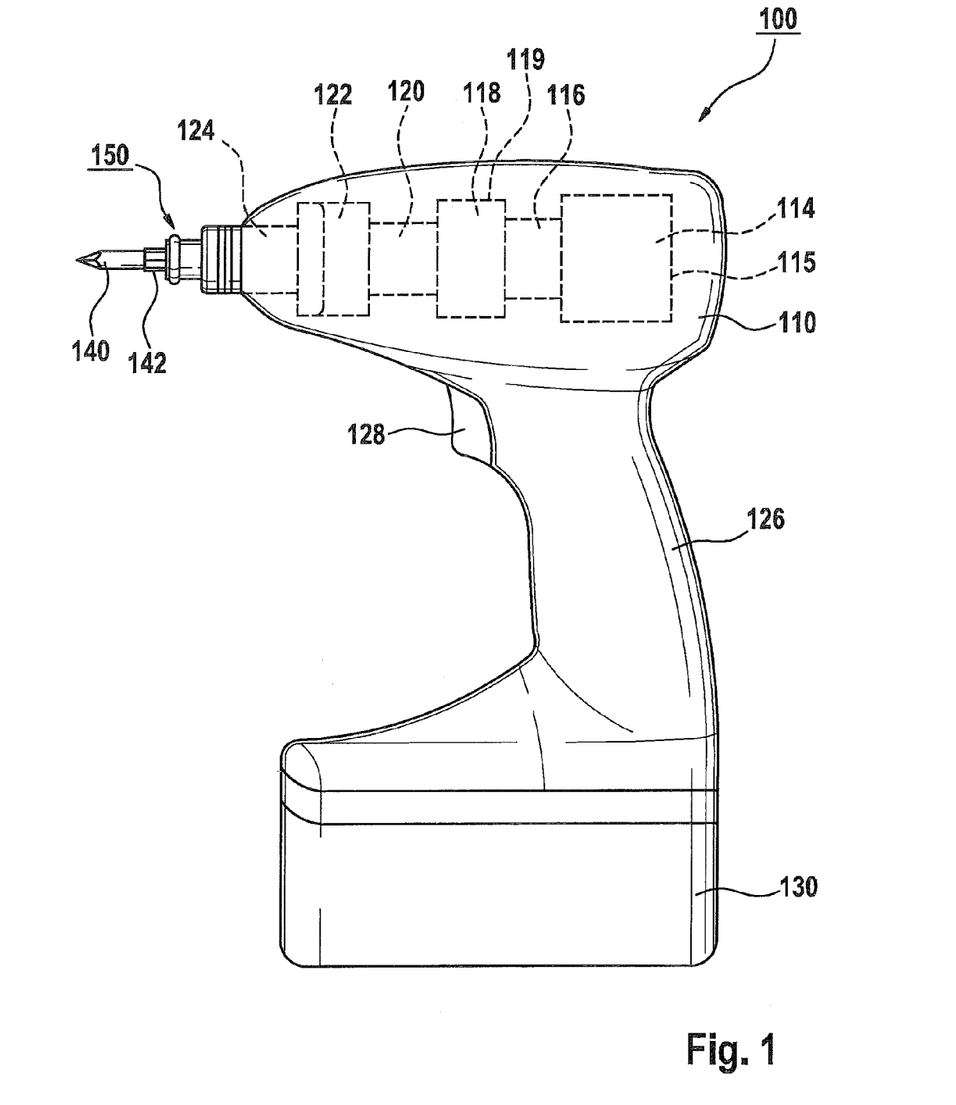
FIG. 1 shows a schematic view of an handheld machine tool having a tool insert according to one specific embodiment.

FIG. 1 shows an handheld machine tool 100 equipped with a tool holding fixture 150, which has a housing 110 having a handle 126. According to one specific embodiment, handheld machine tool 100 is able to be connected mechanically and electrically to a battery pack 130 for a power supply that is network-independent.

Handheld machine tool 100 is designed as a rotary blow screwdriver, by way of example. It should be pointed out, however, that the present invention is not limited to battery pack rotary blow screwdrivers, but rather may be used for different electric tool applications in which a tool is put into rotation, e.g. in a screwdriver, a drilling screwdriver, a rotary blow screwdriver etc., independently of whether the electric tool is to be operated network-independently using a battery pack or dependent on a network. In addition, one should point out that the present invention is not limited to motor-driven handheld machine tools, but is generally usable in tools in which tool holding fixture 150, described in FIGS. 2 through 9, is able to find application.

In tool housing 110, there are situated an electric drive motor 114 supplied with current by battery pack 130, a transmission 118 and a striking mechanism 122. Drive motor 114, for example, is able to be operated via a manual switch 128, that is, switched on and off, and may be of any desired motor type, for example, an electronically commutated motor or a DC motor. Drive motor 114 may be controllable or regulatable in such a way that both a reverse operation and specifications in regard to a desired rotational speed are able to be implemented. The method of functioning and the design of a suitable drive motor are sufficiently known from the related art so that, at this place, a further description may be omitted for the purpose of conciseness in the description.

Drive motor 114 is connected to transmission 118, via an associated motor shaft 116, which converts a rotation of motor shaft 116 to a rotation of a drive shaft 120 that is provided between transmission 118 and striking mechanism 122. This conversion may take place in such a way that drive shaft 120 rotates with respect to motor shaft 116 at an increased torque, but decreased rotational speed. Drive motor 114 is situated illustratively in a motor housing 115, and transmission 118 in a transmission housing 119, and motor housing 115 in housing 110, for example.

Striking mechanism 122 connected to driven shaft 120 is a turning or rotational striking mechanism, which generates abrupt rotating pulses at high intensity, and transmits them to an output shaft 124, such as an output spindle. On output shaft 124, tool holding fixture 150 is provided, which may be configured for accommodating tool inserts, and, according to one specific embodiment, is able to be connected both to a tool insert 140 having an outer multi-faced coupling 142 and to a tool insert having an inner multi-faced coupling, such as a socket wrench. Tool insert 140 is configured, for instance, as a screwdriver bit having an outer multi-faced coupling 142, illustratively an eight-faced coupling which, in a suitable inner receptacle (290 in FIG. 2) is associated with tool holding fixture 150. Such a screwdriver bit as well as a suitable socket wrench are sufficiently known from the related art so that, at this place, a detailed description may be omitted for the purpose of conciseness in the description.

Figure 2:
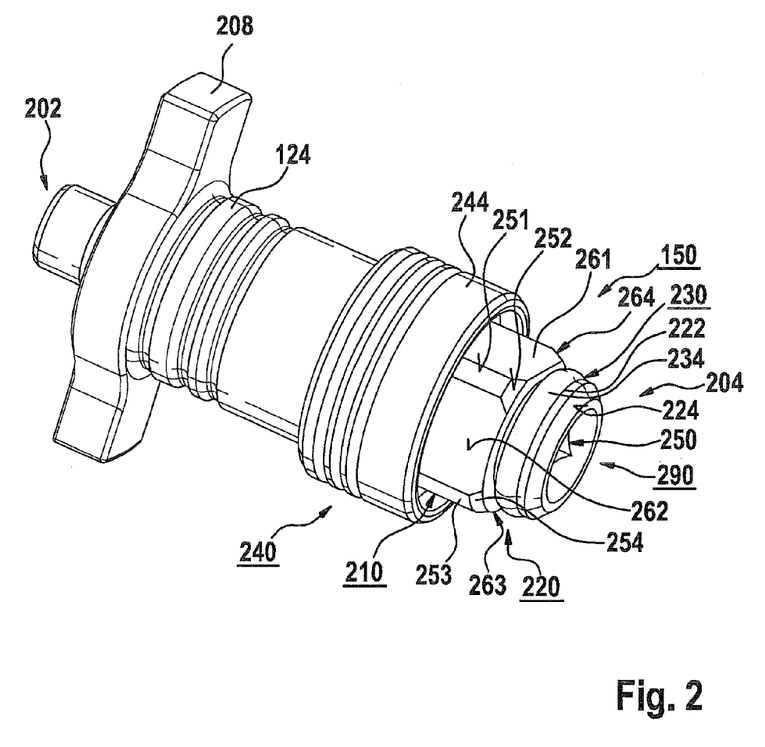
FIG. 2 shows a perspective view of the output shaft having the tool holding fixture of FIG. 1, and having the locking device according to one specific embodiment.

FIG. 2 shows output shaft 124 of FIG. 1, whose proximal end region 202, that is provided with an output cam 208, is connected in FIG. 1 to striking mechanism 122 of handheld machine tool 100. Tool holding fixture 150 is provided on output shaft 124, and in its distal end region 204, illustratively an axial widening 220 is configured. This may be formed onto tool holding fixture 150, and may be configured in one piece with it.

Tool holding fixture 150, that is provided with an outer receptacle 210 and an inner receptacle 290 is illustratively formed onto output shaft 124 and may be configured as one piece with it. To outer receptacle 210, which may be an elastically deformable retaining element 230 is assigned and to inner receptacle 290 an operable locking device 240 is assigned.

Inner receptacle 290 is used to accommodate screwdriver bit 140 of FIG. 1, and is, for instance, configured according to the type of a multi-faced inner receptacle on the inside of output shaft 124, illustratively according to a kind of eight-faced inner profile 250. To inner receptacle 290, an operable locking device 240 for locking screwdriver bit 140 of FIG. 1 is assigned via an operating element 244 that may be embodied as an operating sleeve.

Outer receptacle 210 is a multi-faced outer receptacle, which may be a four-faced outer receptacle which, as seen in the radial direction, has illustratively four preferably flat side surfaces 261, 272, 263, 264, and, according to one specific embodiment, is configured to accommodate a tool insert manufactured according to European or North American industry standards, having an inner multi-faced coupling, such as a socket wrench. Side faces 261, 262, 263, 264 are connected to one another via beveled edges, for instance, faces 261 and 262 are connected to each other via a beveled edge 251, and faces 262 and 263 are connected via a beveled edge 253. The beveled edges, on their part, have beveled end regions towards axial widening 220, e.g. edges 251, 253 have beveled end regions 252 and 254 respectively. Axial widening 220 has a closing collar 222, which has a conically shaped beveled end 224 in the distal direction of output shaft 124.

Retaining element 230, that is fastened on axial widening 220, is configured to fasten a suitable tool insert having inner multi-faced coupling on tool holding fixture 150. This illustratively has a retaining element 234 configured as an elastic, deformable metallic C ring.

Figure 3:
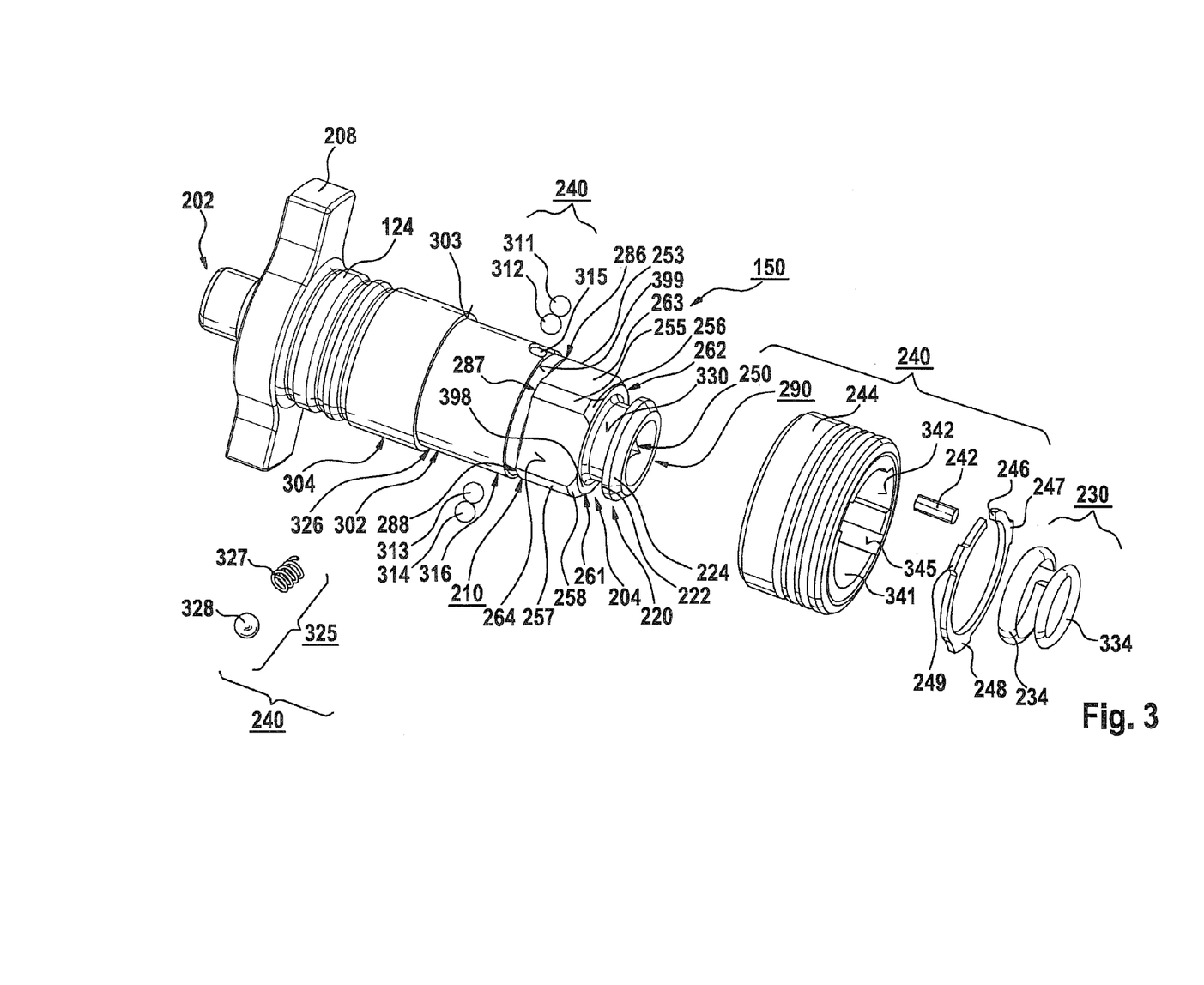
FIG. 3 shows a perspective exploded view of the outgoing shaft having the tool holding fixture of FIGS. 1 and 2 in an assembly of the locking device of FIG. 2.

FIG. 3 shows output shaft 124 with tool holding fixture 150 and axial widening 220, as well as retaining element 230 and locking device 240 of FIG. 2. FIG. 3 is there to illustrate an exemplary assembly of retaining element 230 and locking device 240 to tool holding fixture 150, that is provided with inner receptacle 290 and outer receptacle 210, and output shaft 124. As may be seen in FIG. 3, beveled edges 255 and 257 are provided between side faces 263 and 264 and 264 and 261 of outer receptacle 210. These have beveled end regions 256 and 258, respectively.

According to one specific embodiment, starting from output cam 208 in the direction of distal end region 204, output shaft 124 has a first, which may be cylinder-shaped section 304, having a first diameter D1. At a first shoulder 303, shaft 124 tapers down and goes over into a second cylindrical section 302, having a second diameter D2, where D2<D1. At a second shoulder 399, output shaft 124 tapers down some more and goes over into outer receptacle 210 which, in turn, goes over at a third shoulder 398 into axial widening 220. In the vicinity of first shoulder 303, at second cylinder-shaped section 302, a first radial opening 326 is configured illustratively. In the vicinity of second shoulder 399, at section 302, at least one second radial opening 315 is configured, to which, for example, a third, diametrically oppositely situated opening 316 is assigned. In the region between second shoulder 399 and outer receptacle 210, at least one groove-like recess 286 is configured. Four groove-like recesses may be provided, of which only recesses 286, 287, 288 are visible in FIG. 3, which are each configured between second shoulder 399 and associated, beveled edges 253, 255 and 257. At axial widening 220, between third shoulder 398 and closing collar 222, an outer groove-like recess is configured in the form of an annular groove 330.

Let it be pointed out that the distance between opposite beveled edges, for instance, between edges 253 and 257, which may be correspond to about diameter D2 of second section 302 of output shaft 124, so that between these beveled edges 253, 257 and second shoulder 399 the above-mentioned groove-like recesses 286 and 288 are configured. The distance between opposite side faces of four-edge outer receptacle 210, i.e. the distance between side faces 261 and 263 or the distance between side faces 262 and 264, for example, is smaller than diameter D2, and probably specified in such a way that, between side faces 261, 262, 263, 264 and shoulder 399, no recesses are configured. It is also possible, however, also to develop groove-like recesses between side faces 261, 262, 263, 264 and shoulder 399, which, in addition, are able to form an annular groove, for example, with groove-like recesses 286, 287, 288.

According to one specific embodiment, locking device 240 has actuating sleeve 244, a blocking element 242 configured like a bolt, a retaining element 246 configured as a C ring, for example, a spring element 325 having a pressure spring 327 and a ball 328, as well as four balls 311, 312, 313, 314. Actuating sleeve 244 has illustratively an inner circumference 341 at which, according to one specific embodiment, two unlocking recesses 345 (and 545 in FIGS. 5, 7 and 8), a recess 342 and a groove (428 in FIGS. 4, 6, 7 and 9) are provided, whose functionality is described below, at FIGS. 4 through 9. Pressure spring 327 and ball 328 are able to be introduced into opening 326, balls 311, 312 into opening 315, and balls 313, 314 into opening 316 of output shaft 124. Pressure spring 327 together with ball 328 and balls 311, 312, 313, 314 are retained by actuating sleeve 244, which is able to be slid onto output shaft 124 in the direction of output cam 208, in openings 326, 315 and 316, respectively, which is shown below at FIG. 4.

Figure 4:
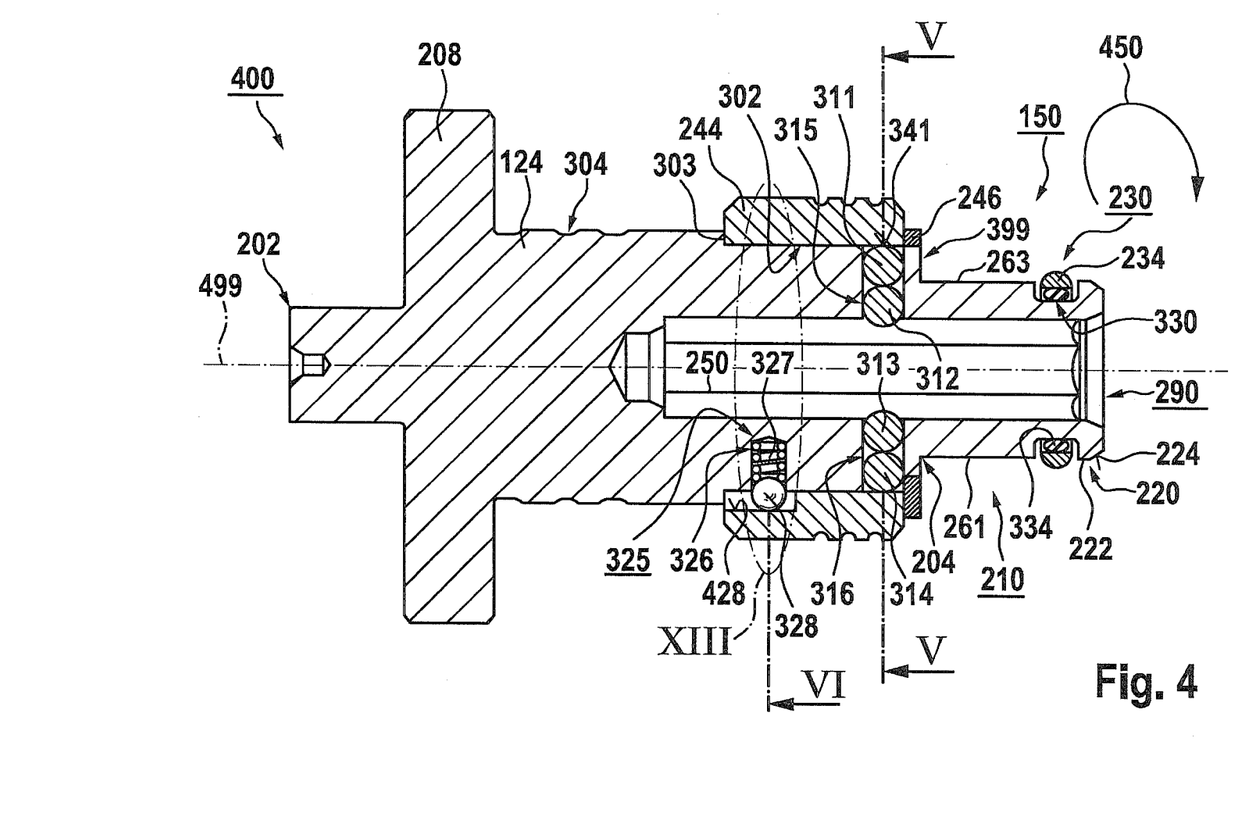
FIG. 4 shows a sectional view in the longitudinal direction of the output shaft having the tool holding fixture and the locking device of FIGS. 2 and 3 in the locking position, as well as a resetting device according to a first specific embodiment.

In the case of an exemplary assembly of locking device 240, at tool holding fixture 150 or output shaft 124, after introducing pressure spring 327 and ball 328 as well as balls 311, 312, 313, 314 into openings 326, 315 and 316 respectively, first blocking bolt 242, as described below for FIG. 5, then actuating sleeve 244 and finally retaining C-ring 246 that is provided with radial widenings 247, 248, 249 are slid on in the direction of output cam 208 in such a way that retaining C ring 246 engages in the groove-like recesses 286, 287, 288. Consequently, radial widenings 247, 248, 249 block actuating sleeve 244 and fix locking device 240 on output shaft 124.

It is pointed out, however, that the use, described within the scope of the exemplary embodiments and/or exemplary methods of the present invention, of locking device 240, according to the exemplary embodiments and/or exemplary methods of the present invention, with tool holding fixture 150 of FIG. 3 has only an exemplary character, and should not be understood to be a restriction on the invention. Rather, locking device 240 may be used in conjunction with different tool holding fixtures, for instance, with the various tool holding fixtures shown in DE 10 2010 002 352 A1 and DE 10 2010 002 353 A1.

According to one specific embodiment, retaining element 230 has metallic C ring 234 of FIG. 2, and a spring element 334, which may be configured as an O ring, of an elastic rubber material. This is used in order, after the assembly, to act upon C ring 234 radially, using a specified spring force. For the assembly of retaining element 230 on axial widening 220, elastic O ring 334 is first pushed or pressed over closing collar 222 into annular groove 330. Then metal C ring 234 is situated radially over O ring 334, for instance, by sliding it on over closing collar 222.

FIG. 4 shows an array 400 having output shaft 124, tool holding fixture 150 and axial widening 220 of FIG. 2 after an assembly, described above in connection with FIG. 3, of locking device 240 and retaining element 230 of FIG. 3. In this instance, locking device 240 is shown in an associated locking position, in which balls 311, 312, 313, 314 are pressed radially inwards into openings 315 and 16, respectively by inner circumference 341 of actuating sleeve 244. In order to move locking device 240 from the locking position into an unlocking position, actuating sleeve 244 has to be rotated in the direction of an arrow 450, as is described below, in the case of FIGS. 5 and 6.

As may be seen in FIG. 4, actuating sleeve 244, according to one specific embodiment, is situated coaxially with a longitudinal axis 499 of tool holding fixture 150 and axially immovable between first shoulder 303 and retaining C ring 246, but rotatable about the longitudinal axis 499 in and against the direction of arrow 450. In a groove 428 that is configured on inner circumference 341 of sleeve 244, ball 328 of spring element 325 is situated, at least in sections. Spring element 325, opening 326 and groove 428 form a resetting device according to a first specific embodiment.

Figure 5:
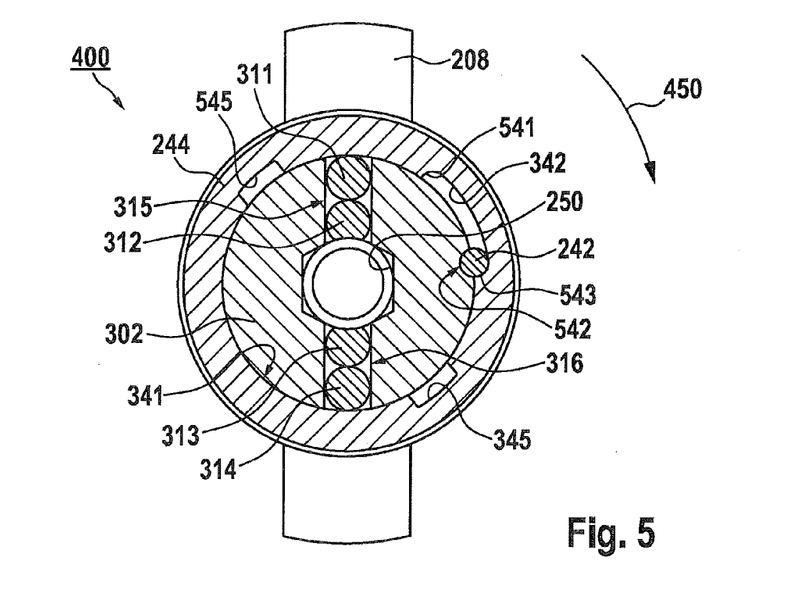
FIG. 5 shows a sectional view in the transverse direction of the device of FIG. 4. as seen in the direction of arrows V-V of FIG. 4.

FIG. 5 shows array 400 of FIG. 4 with balls 311, 312 and 313, 314, respectively, situated in openings 315, 316, pressed radially inwards in the direction of eight-faced inner profile 250 by inner circumference 341 of actuating sleeve 244. Blocking bolt 242, on the one hand, is situated, in sections, in a recess 542 provided on second section 302 of output shaft 124 of FIG. 3, and on the other hand, in sections, in recess 342 provided on actuating sleeve 244. At this recess, two shoulder-like stopping elements 541, 543 are configured, which are used to prevent a rotation of actuating sleeve 244 beyond the specified locking position or the specified unlocking position. In the locking position shown in FIG. 5, stopping shoulder 543 lies against blocking bolt 242.

In the case of a rotation of actuating sleeve 244 in the direction of arrow 450, recess 342 is moved over blocking bolt 242 until stopping shoulder 541 stops against bolt 242, and thus the unlocking position is reached. In this instance, unlocking recess 345 configured on inner circumference 341 of sleeve 244 and an additional unlocking recess 545 also configured on the same are positioned over balls 314 and 311, respectively, as described below for FIG. 8.

Figure 6:
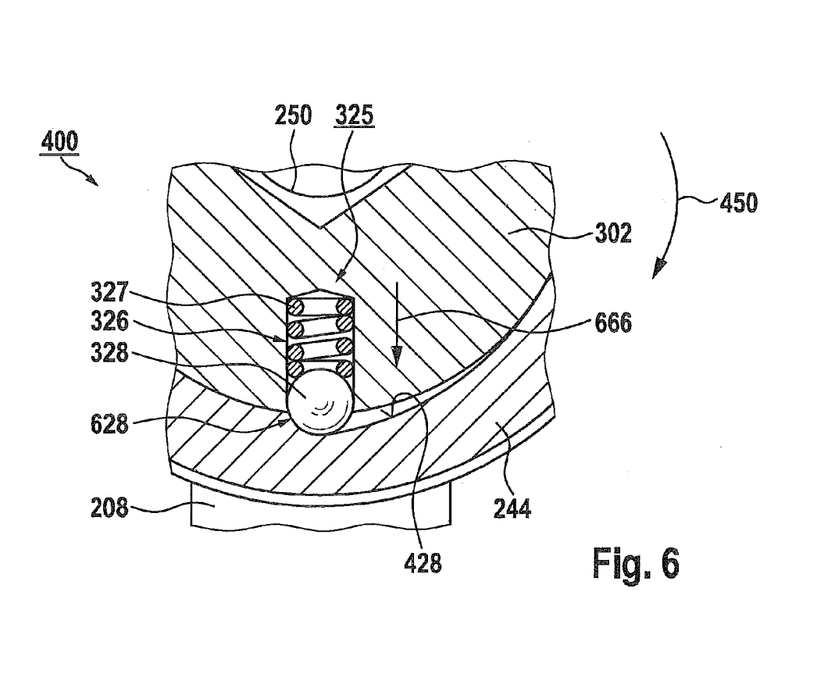
FIG. 6 shows an enlarged sectional view in the transverse direction of a cutout of the device of FIG. 4, as seen in the direction of arrows VI-VI of FIG. 4.

FIG. 6 shows spring element 325 of array 400 of FIG. 4, in which pressure spring 327 presses ball 328 in the direction of an arrow 666 into a position provided, according to one specific embodiment, maximally radially outwards into groove 428 configured on actuating sleeve 244, which corresponds to the locking position of locking device 240 of FIG. 4. At this point, ball 328 lies against an illustratively shoulder-type stop 628 that is configured on groove 428. When actuating sleeve 244 is rotated in the direction of arrow 450, groove 428 is moved over ball 328 until ball 328 is pressed into opening 326 against the force of pressure spring 327 into a position, according to one specific embodiment, that is provided to be maximally radially inwards, as is described below for FIG. 9.

Figure 7:
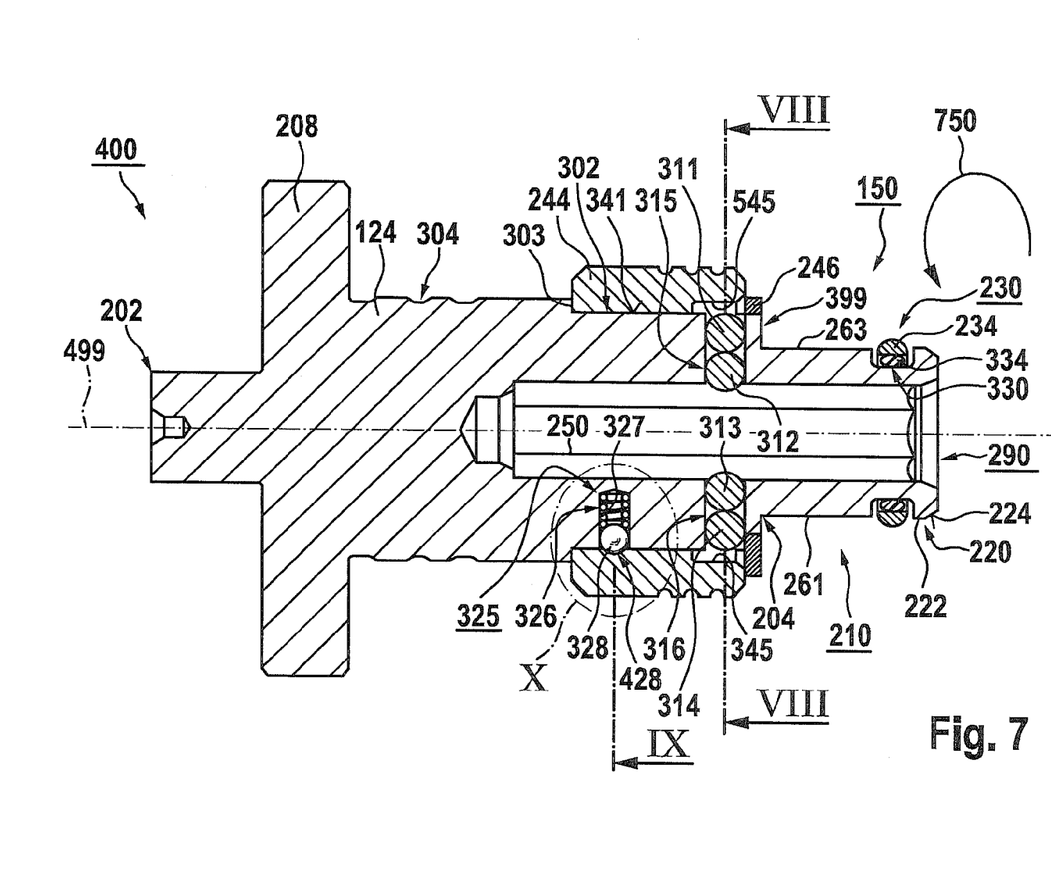
FIG. 7 shows a sectional view in the longitudinal direction of the output shaft and the locking device of FIGS. 2 and 3 in the unlocking position.

FIG. 7 shows array 400 of FIG. 4 after a rotation of actuating sleeve 244 in the direction of arrow 450 of FIG. 4 into an associated unlocking position, in which balls 311, 312, 313, 314 situated in openings 315 and 316, respectively are able to be displaced radially outwards in such a way that balls 311, 314 are able to engage, at least in sections, with unlocking recesses 545 and 345, respectively, that are provided on inner circumference 341 of actuating sleeve 244. In order to move locking device 240 from the locking position back into an unlocking position shown in FIG. 4, actuating sleeve 244 has to be rotated in the direction of an arrow 750, as is described below, in the case of FIGS. 8 and 9. In addition, FIG. 7 shows the position provided, according to one specific embodiment, maximally radially inwards of ball 328 pressed into opening 326 against the force of pressure spring 327.

Figure 8:
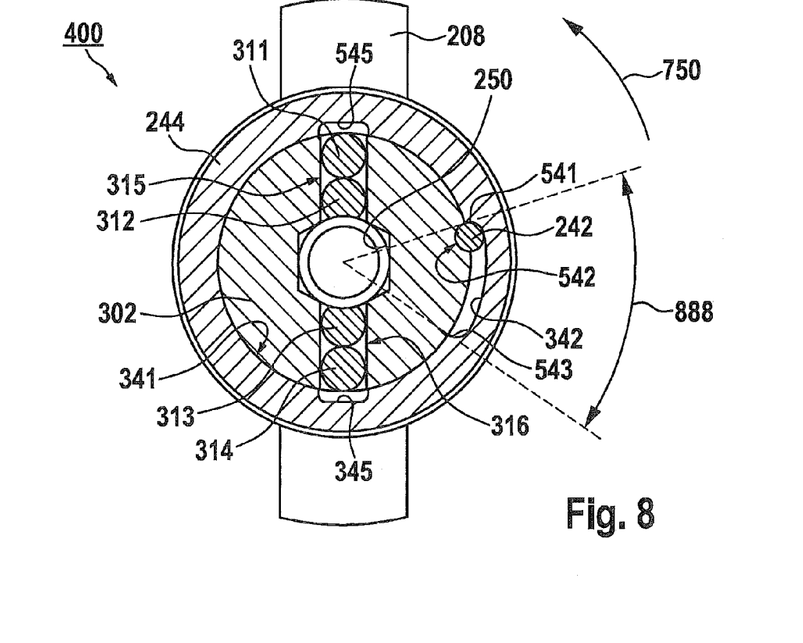
FIG. 8 shows a sectional view in the transverse direction of the device of FIG. 7, as seen in the direction of arrows VIII-VIII of FIG. 7.

FIG. 8 shows array 400 of FIG. 7 having unlocking recesses 545 and 345, respectively, situated in the area of balls 311, 314, as well as of stopping shoulder 541 lying against bolt 242. In this instance, balls 311, 312, 313, 314 are able to be displaced, for introducing or removing a suitable tool insert having an outer multi-faced coupling, e.g. a tool insert 140 having an outer multi-faced coupling 142 of FIG. 1, radially outwards in the direction of associated unlocking recesses 545 and 345, respectively.

As may be seen in FIG. 8, actuating sleeve 244 has been rotated, starting from the locking position shown in FIGS. 4 through 6, by an angle of rotation 888, into the unlocking position. This angle of rotation 888 is specified by an extension of recess 342, in the circumferential direction, that is configured on the inner circumference 341 of actuating sleeve 244, and preferably amounts to less than 180°, which may be less than 90°, and especially preferably less than 45°. In the specific embodiment shown, angle of rotation 888 is illustratively about 40°.

Figure 9:
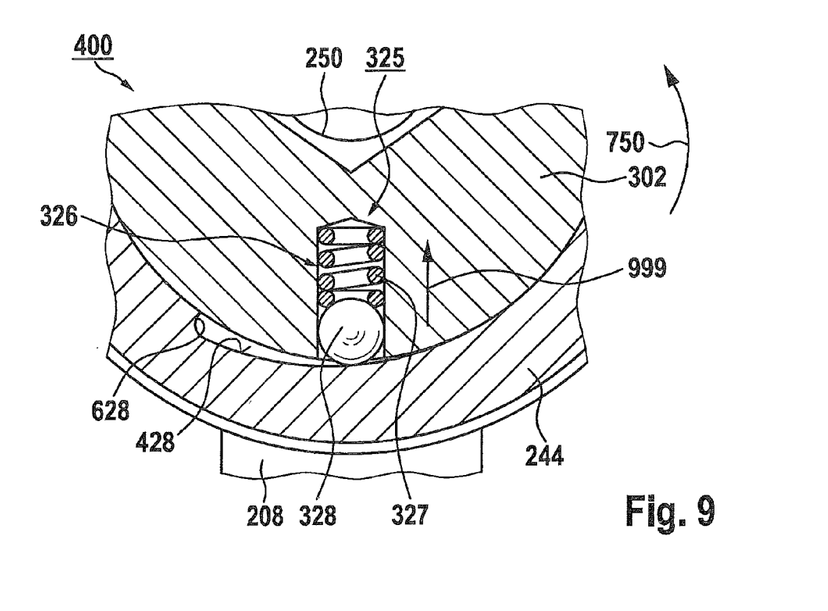
FIG. 9 shows an enlarged sectional view in the transverse direction of a cutout of the device of FIG. 7, as seen in the direction of arrows IX-IV of FIG. 7.

FIG. 9 shows the position provided, according to one specific embodiment, maximally radially inwards of ball 328 pressed into opening 326 against the force of pressure spring 327, in the direction of an arrow 999. According to one specific embodiment, a user of handheld machine tool 100 of FIG. 1 has to block or retain actuating sleeve 244 in this unlocking position, in order to prevent automatic rotation of sleeve 244 into the locking position shown in FIG. 4. When the user releases actuating sleeve 244, pressure spring 327 presses ball 328 in a direction opposite to arrow 999, i.e. in the direction of arrow 666 of FIG. 6, in such a way that groove 428 is moved over ball 328 until ball 328 stops against shoulder-like stop 628, as was described above for FIG. 6. Actuating sleeve 244 is thus moved automatically from the locking position into the unlocking position.

Figure 10:
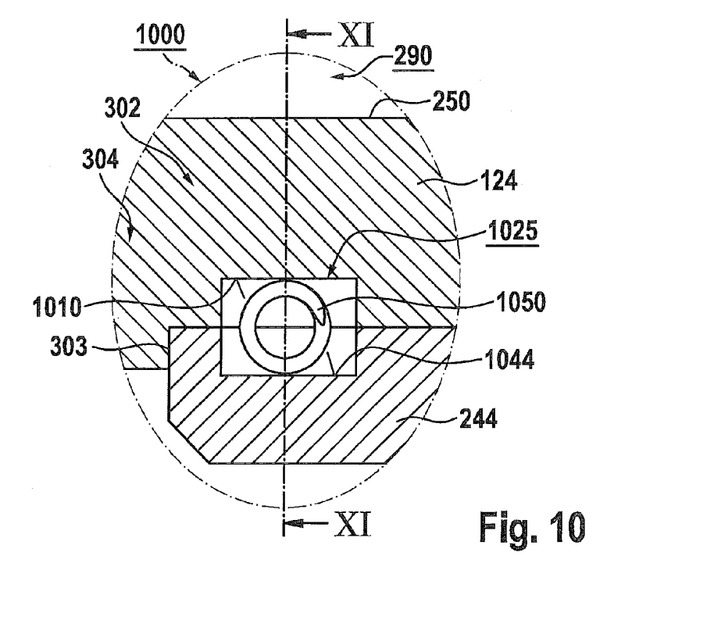
FIG. 10 shows an enlarged sectional view of a cutout X of the device of FIG. 7 having a resetting device according to a second specific embodiment.

FIG. 10 shows an enlarged cutout 1000 of array 400 of FIG. 7 having a resetting device 1025 provided on it, according to a second specific embodiment, which may have application instead of spring element 325 of FIG. 7 that is situated in opening 326 of FIG. 7 and cooperates with groove 428. Resetting device 1025 has a spring element 1050 illustratively configured as a pressure spring which, for example, is situated in a first groove-like recess 1010 provided in second section 302 of output shaft 124 as well as a second groove-like recess 1044 provided in actuating sleeve 244. In an alternative embodiment variant, spring element 1050 is configured as a tension spring.

Figure 11:
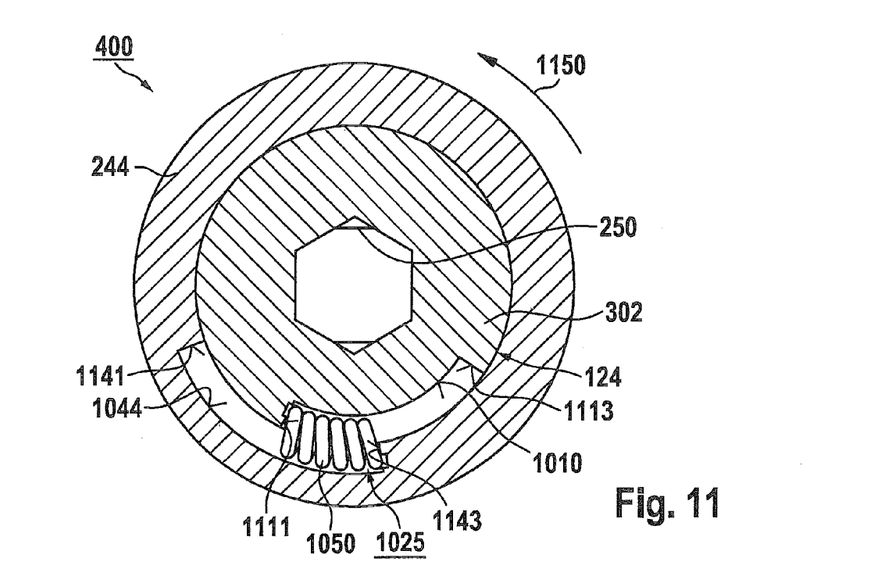
FIG. 11 shows a sectional view in the transverse direction of the device of FIG. 7, having the resetting device of FIG. 10, as seen in the direction of arrows XI-XI of FIG. 10 during the unlocking of the locking device of FIG. 7.

FIG. 11 shows array 400 of FIG. 7 executed with resetting device 1025 of FIG. 10, in which actuating sleeve 244 is rotated illustratively into the unlocking position. In this unlocking position actuating sleeve 244 has to be held against a pressure force applied by pressure spring 1050, as described below.

Pressure spring 1050 is situated, as described above in connection with FIG. 10, in first groove-like recess 1010 provided on output shaft 124 and second groove-like recess 1044 provided on actuating sleeve 244. First groove-like recess 1010 has at its ends, in the longitudinal direction, for example, a fastening shoulder 1111 and an opposite shoulder 1113. Second groove-like recess 1044 has at its ends, in the longitudinal direction, for example, a fastening shoulder 1143 and an opposite shoulder 1141. On fastening shoulder 1111, 1143, an axial end of pressure spring 1050 is fastened illustratively in each case, in order thus to achieve improved stability of resetting device 1025.

It should be pointed out, however, that pressure spring 1050 may also be situated unfastened in recesses 1010, 1044, as long as it is ensured, for instance, that, during operation of handheld machine tool 100 of FIG. 1, it cannot slip exclusively into one of recesses 1010, 1044 or be pressed in. This may be prevented, for example in that the diameter of pressure spring 1050 is selected to be comparatively large with respect to a height of recesses 1010 and 1044.

According to one specific embodiment, pressure spring 1050 is compressed in the unlocking position between fastening shoulders 1111, 1143. When actuating sleeve 244 is released, pressure spring 1050 expands and this effects a rotation of actuating sleeve 244 relative to output shaft 124 in the direction of an arrow 1150, in the case of which actuating sleeve 244 is moved into the locking position shown in FIG. 12.

Figure 12:
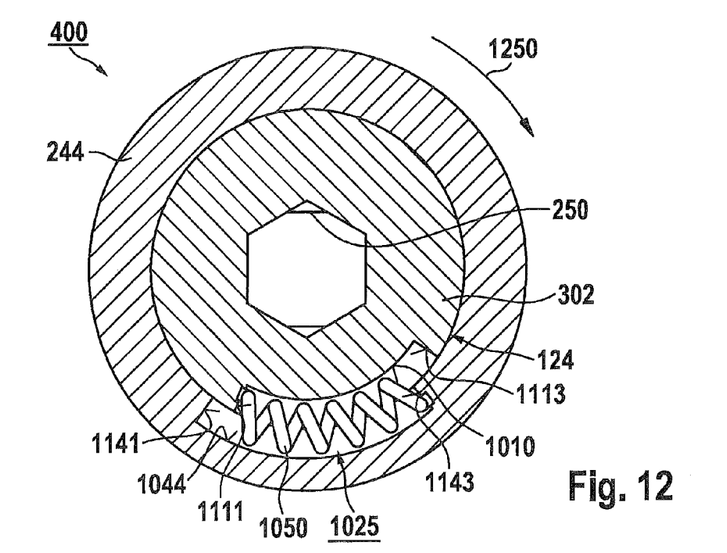
FIG. 12 shows the sectional view of FIG. 11 during the locking of the locking device of FIG. 7.

FIG. 12 shows the sectional view of FIG. 11, in which actuating sleeve 244 has rotated illustratively, by the expansion of pressure spring 1050, automatically in the direction of arrow 1150 of FIG. 11 into the locking position. In this locking position, actuating sleeve 244 is held by the pressure force applied by expanded pressure spring 105. By rotating actuating sleeve 244 against the pressure force of pressure spring 1050 in the direction of an arrow 1250, actuating sleeve 244 may then be moved again into the unlocking position shown in FIG. 11. In this instance, rotating actuating sleeve 244 is possible by only a specified angle of rotation, such as angle of rotation 888 of FIG. 8, as described above for FIG. 8.

Figure 13:
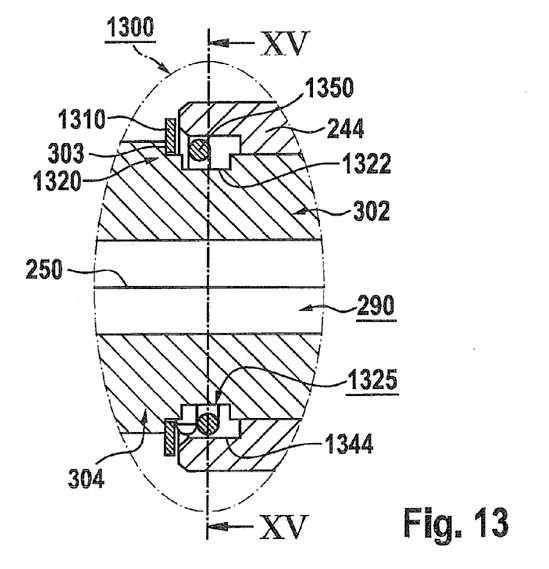
FIG. 13 shows an enlarged sectional view of a cutout XIII of the device of FIG. 4 having a resetting device according to a third specific embodiment.

FIG. 13 shows an enlarged cutout 1300 of array 400 of FIG. 4 having a resetting device 1325 provided on it, according to a third specific embodiment, resetting device 1325 being able to find application instead of spring element 325 of FIG. 4 that is situated in opening 326 of FIG. 4 and cooperates with groove 428. Resetting device 1325 has a spring element 1350 illustratively configured as a torsion spring which, for example, is situated in a first groove-like recess 1322 provided in second section 302 of output shaft 124 as well as a second groove-like recess 1344 provided in actuating sleeve 244.

According to one specific embodiment, slipping is prevented of torsion spring 1350 in the direction of first section 304 of output shaft 124 in the operation of handheld machine tool 100 of FIG. 1 or in response to unlocking of actuating sleeve 244, illustratively by a supporting disk 1310. The latter is supported on shoulder 303 between first and second section 304 and 302, respectively, of output shaft 124 in the area of a stepping 1320. Stepping 1320 forms a transition from shoulder 303 to groove-like recess 1322.

Figure 14:
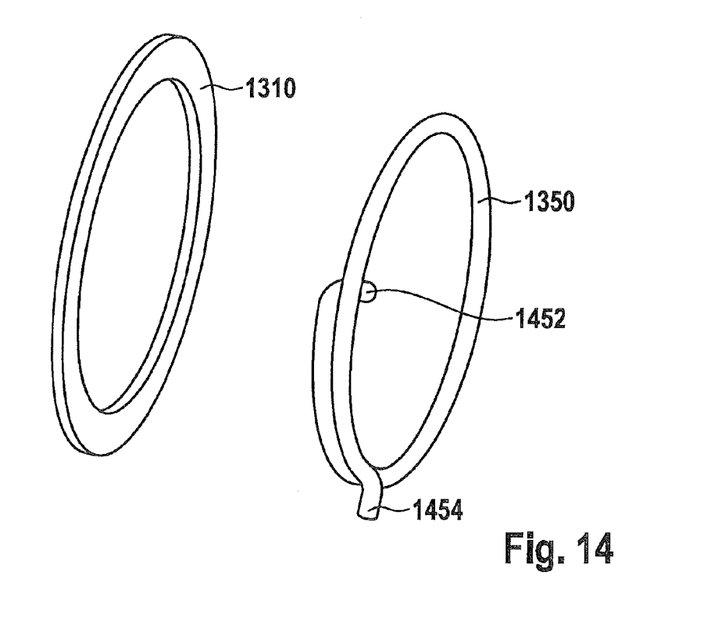
FIG. 14 shows a perspective view of a torsion spring and a supporting disk of the resetting device of FIG. 13.

FIG. 14 shows an exemplary specific embodiment of supporting disk 1310 and torsion spring 1350 of FIG. 13. Supporting disk 1310 is configured illustratively to be annular. Between its first spring end 1452 and its second spring end 1454, torsion spring 1350 illustratively spans an angle of about 450°. It should be pointed out, however, that the representation of an angle of 450° only has an exemplary character, and is not used to restrict the exemplary embodiments and/or exemplary methods of the present invention. Rather, the latter may be executed having a plurality of different torsion springs, which include a plurality of different angles, as long as the functionality described below for FIG. 15 is assured.

Figure 15:
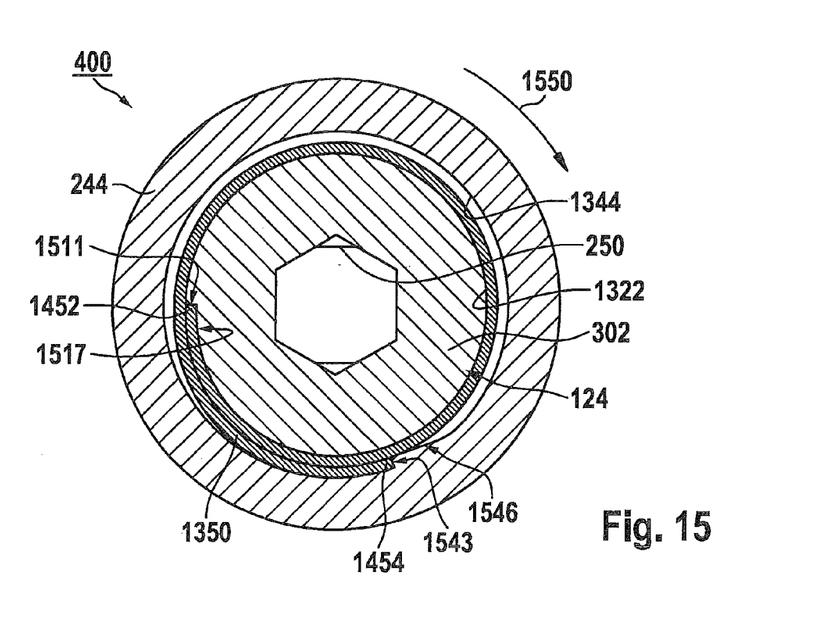
FIG. 15 shows a sectional view in the transverse direction of the device of FIG. 4, having the resetting device of FIG. 13, as seen in the direction of arrows XV-XV of FIG. 13 during the locking of the locking device of FIG. 4.

FIG. 15 shows array 400 of FIG. 4 executed with resetting device 1325 of FIG. 13, in which actuating sleeve 244 is rotated illustratively into the unlocking position. Actuating sleeve 244 is able to be rotated from this locking position into the unlocking position against a resetting force applied in the direction of an arrow 1550.

As may be seen in FIG. 15, torsion spring 1350 is supported, in the locking position of actuating sleeve 244, essentially in first groove-like recess 1322 that is provided in second section 302 of output shaft 124, first spring end 1452 lying illustratively against a first retaining shoulder 1522, which is configured in a depression 1517 provided in recess 1322. In addition, torsion spring 1350 is situated in sections in second groove-like recess 1344 that is provided in actuating sleeve 244, second spring end 1454 lying illustratively against a second retaining shoulder 1543, which is configured in an elevation 1546 provided in recess 1344.

According to one specific embodiment, when actuating sleeve 244 is rotated from the locking position in the direction of arrow 1550, second spring end 1454 is displaced from second retaining shoulder 1543 in the direction of arrow 1550. Because of this, torsion spring 1350 widens out radially into groove-like recess 1344 and consequently is loaded or stressed until actuating sleeve 244 reaches the unlocking position, In this instance, rotating actuating sleeve 244 is possible by only a specified angle of rotation, such as angle of rotation 888 of FIG. 8, as described above for FIG. 8. When actuating sleeve 244 is released, as a result, it is able to be moved back by the resetting force of stressed torsion spring 1350 into a direction, opposite to arrow 1550, into the locking position shown in FIG. 15.

What is claimed is:

1. A handheld machine tool, comprising:
    a drive motor;
    an output shaft
    a rotary striking mechanism configured to provide rotary impacts on or to the output shaft;
    a locking device; and
    a tool holding fixture, which has a multi-faced inner receptacle and a multi-faced outer receptacle, the multi-faced inner receptacle being configured for connection to a first tool insert which is lockable in the multi-faced inner receptacle, using the locking device assigned to the tool holding fixture, and the multi-faced outer receptacle being configured for connection to a second tool insert which has an inner multi-faced coupling that is slidable onto the multi-faced outer receptacle;
    wherein the locking device has an actuating element which, for unlocking the first tool insert from a specified locking position, is rotatable about a longitudinal axis of the tool holding fixture into a specified unlocking position, wherein the locking device has a plurality of locking balls which are supported in openings of the output shaft and which are movable radially inwardly relative to the longitudinal axis of the tool holding fixture for locking the first tool insert in the multi-faced inner receptacle upon rotation of the actuating element from the specified unlocking position to the specified locking position, wherein the locking device has a blocking element for blocking the actuating element in the specified locking position or in the specified unlocking position, the blocking element being separate from the locking balls, wherein the actuating element has a first stopping element and a second stopping element, the first stopping element lying against the blocking element for blocking the actuating element in the specified unlocking position, and the second stopping element lying against the blocking element for blocking the actuating element in the specified locking position, wherein the locking device has a resetting device configured to move the actuating element from the unlocking position into the locking position automatically, the resetting device having a pressure spring and a ball, the pressure spring being configured to act upon the actuating element via the ball using a specified spring force in a direction running radially relative to the longitudinal axis of the tool holding fixture.

2. The handheld machine tool of claim 1, wherein the blocking element is configured to prevent a rotation of the actuating element beyond the specified locking position or the specified unlocking position.

3. The handheld machine tool of claim 1, wherein the actuating element is configured to be sleeve-shaped, and has a recess at its inner circumference, in which the blocking element is situated, at least in sections, and at which the first stopping element and the second stopping element are configured in a shoulder-type manner.

4. The handheld machine tool of claim 3, wherein the sleeve-shaped actuating element is situated coaxially with the longitudinal axis of the tool holding fixture.

5. The handheld machine tool of claim 1, wherein the blocking element is configured like a bolt.

6. The handheld machine tool of claim 1, wherein the actuating element is configured to be sleeve-shaped and has a groove having a stop, on its inner circumference, against which the spring element lies in the specified locking position.

7. The handheld machine tool of claim 6, wherein the spring element is configured to act upon the actuating element in the specified unlocking position, using its spring force, to provide for a rotation of the actuating element relative to the tool holding fixture, the groove on the spring element being displaced until the stopping at the stop on the spring element.

\* \* \* \* \*